(12) United States Patent
Otsuka et al.

(10) Patent No.: US 9,791,254 B2
(45) Date of Patent: Oct. 17, 2017

(54) SCALE FIXATING DEVICE

(71) Applicant: MITUTOYO CORPORATION, Kanagawa (JP)

(72) Inventors: Takanori Otsuka, Utsunomiya (JP); Masaru Ogiwara, Utsunomiya (JP)

(73) Assignee: MITUTOYO CORPORATION, Kanagawa (JP)

( * ) Notice: Subject to any disclaimer, the term of this patent is extended or adjusted under 35 U.S.C. 154(b) by 145 days.

(21) Appl. No.: 14/972,425

(22) Filed: Dec. 17, 2015

(65) Prior Publication Data
US 2016/0187117 A1 Jun. 30, 2016

(30) Foreign Application Priority Data

Dec. 27, 2014 (JP) .................................. 2014-266856
Jul. 14, 2015 (JP) .................................. 2015-140317

(51) Int. Cl.
*G01B 11/04* (2006.01)
*G01B 7/04* (2006.01)
*G01B 3/10* (2006.01)

(52) U.S. Cl.
CPC ............. *G01B 3/1071* (2013.01); *G01B 7/04* (2013.01); *G01B 11/04* (2013.01); *G01B 2003/1079* (2013.01)

(58) Field of Classification Search
CPC .................................. G01B 11/04; G01B 7/04
USPC .................................................. 33/706–708
See application file for complete search history.

(56) References Cited

U.S. PATENT DOCUMENTS

| 3,816,002 | A | * | 6/1974 | Wieg | G01D 5/34753 |
| | | | | | 33/707 |
| 4,060,903 | A | * | 12/1977 | Ernst | G01B 3/004 |
| | | | | | 250/237 G |
| 4,160,328 | A | * | 7/1979 | Ernst | G01B 5/02 |
| | | | | | 33/705 |
| 4,170,829 | A | * | 10/1979 | Nelle | G01B 5/0009 |
| | | | | | 33/702 |
| 4,320,578 | A | * | 3/1982 | Ernst | G01B 3/002 |
| | | | | | 33/484 |

(Continued)

FOREIGN PATENT DOCUMENTS

| JP | 63-252213 | 10/1988 |
| JP | 4477442 | 3/2010 |

(Continued)

*Primary Examiner* — Christopher Fulton
(74) *Attorney, Agent, or Firm* — Greenblum & Bernstein, P.L.C.

(57) ABSTRACT

A scale fixating device includes a fixing block unmovably fixating a first end of a scale to an object, and a pulling block fixating a second end of the scale to the object while pulling the second end of the scale to the second end side. The pulling block includes a fixated base fixated to an object, a slide holding the second end of the scale and installed slidably with respect to the fixated base, and a pulling mechanism having a first end engaged to the slide and a second end engaged to the fixated base, the pulling mechanism pulling the slide toward the second end relatively with respect to the fixated base. The scale fixating device either prevents a friction force from changing between the slide and the fixated base or generates an extremely large friction force between the slide and the fixated base.

12 Claims, 8 Drawing Sheets

(56) References Cited

U.S. PATENT DOCUMENTS

| | | | | |
|---|---|---|---|---|
| 4,534,113 | A * | 8/1985 | Holstein | G01B 3/002 |
| | | | | 33/707 |
| 4,554,741 | A * | 11/1985 | Affa | G01B 5/0014 |
| | | | | 250/237 G |
| 4,559,707 | A * | 12/1985 | Oberhans | G01B 3/002 |
| | | | | 33/702 |
| 4,776,098 | A * | 10/1988 | Nelle | G01B 5/0014 |
| | | | | 33/702 |
| 4,912,856 | A * | 4/1990 | Ernst | G01B 5/0014 |
| | | | | 33/702 |
| 5,832,616 | A * | 11/1998 | Fiedler | G01D 5/34707 |
| | | | | 33/702 |
| 6,098,295 | A * | 8/2000 | Feichtinger | G01B 5/02 |
| | | | | 33/1 PT |
| 6,701,634 | B2 * | 3/2004 | Henshaw | F16C 29/005 |
| | | | | 33/706 |

FOREIGN PATENT DOCUMENTS

| | | |
|---|---|---|
| JP | 2011-237310 | 11/2011 |
| JP | 2013-7718 | 1/2013 |

* cited by examiner

SCALE FIXATING DEVICE

CROSS-REFERENCE TO RELATED APPLICATIONS

The present application claims priority under 35 U.S.C. §119 of Japanese Application No. 2014-266856, filed on Dec. 27, 2014, and Japanese Application No. 2015-140317, filed on Jul. 14, 2015, the disclosures of which are expressly incorporated by reference herein in their entirety.

BACKGROUND OF THE INVENTION

1. Field of the Invention

The present invention relates to a scale fixating device. Specifically, the present invention relates to a device for fixating a scale enabling accuracy of a scale to be maintained when mounting and fixating an elongated scale to an object.

2. Description of Related Art

As a scale in an instrument measuring length (linear encoder), a tape scale formed in a thin tape shape made of glass or a metal is known. (Japanese Patent Laid-open Publication No. 2011-237310, Japanese Patent No. 4,477,442, Japanese Patent Laid-open Publication No. 2013-7718, and Japanese Patent Laid-open Publication No. S63-252213.) The tape scale provides advantages such as easy lengthening, easy transportation, and simple mounting.

When a tape scale is mounted and fixated to an object, tension is applied in a measurement axis direction. For example, a first end of the tape scale is unmovably fixated to the object and a second end of the tape scale is fixated to a sliding member allowing the second end of the tape scale to move relative to the object. In addition, the tension is applied to the sliding member so as to pull the second end of the tape scale. As a result, even in a case where the tape scale is expanded/contracted by a change in temperature, the tape scale maintains straightness. Generally, a guarantee temperature is set from 0° C. to 50° C. and the tension is applied such that the straightness is maintained within this range. For example, when the tape scale is made of a SUS material, there is about 10.5 µm expansion/contraction per 1 meter with a change in temperature of 1° C. In order to absorb the expansion/contraction, when the encoder is installed at a temperature of 20° C., a pull of 250 µm per 1 meter is required.

As described above, the predetermined tension is applied to the tape scale via the sliding member, however, when inspected after some time following the encoder installation, the tension is often changed. In other words, the sliding member is pulled by the predetermined amount (250 µm per 1 meter), however, a position of the sliding member is displaced from an initial installed position when inspected after some time. A user of the encoder does not check if the tension of the tape scale is appropriate or not once the encoder is installed, which may lead to a measurement error.

Displacement does not occur in all cases and although a cause was unknown, was thought to be a difference in ability during encoder installation. The present inventors have carried out extensive studies and succeeded in shedding light on a fundamental cause, as well as devising a countermeasure to achieve the present disclosure.

SUMMARY OF THE INVENTION

An advantage of the present disclosure is to provide a scale fixating device capable of maintaining accuracy of a scale while preventing tension of the scale from changing.

The scale fixating device according to the present disclosure installs and fixates the scale to an object and includes a fixing block part unmovably fixating a first end of the scale to the object and a pulling block part fixating a second end of the scale to an object while pulling the second end of the scale. The pulling block part includes a fixated base fixated to the object, a slide part holding the second end of the scale and installed slidably with respect to the fixated base, and a pulling mechanism (also referred to as a "puller") having a first end engaged to the slide part and a second end engaged to the fixated base, the pulling mechanism pulling the slide part toward the second end relatively with respect to the fixated base. A surface of the slide part contacting the fixated base is beveled.

The scale fixating device according to the present disclosure installs and fixates the scale to the object and includes the fixing block part unmovably fixating the first end of the scale to the object and the pulling block part fixating the second end of the scale to the object while pulling the second end of the scale. The pulling block part includes the fixated base fixated to the object, the slide part holding the second end of the scale and installed slidably with respect to the fixated base, and the pulling mechanism having the first end engaged to the slide part and the second end engaged to the fixated base, the pulling mechanism pulling the slide part toward the second end relatively with respect to the fixated base. At least one of a mutual contact surface of the slide part and a mutual contact surface of the fixated base is mirror finished.

The scale fixating device according to the present disclosure installs and fixates the scale to the object and includes the fixing block part unmovably fixating the first end of the scale to the object and the pulling block part fixating the second end of the scale to the object while pulling the second end of the scale. The pulling block part includes the fixated base fixated to the object, the slide part holding the second end of the scale and installed slidably with respect to the fixated base, and the pulling mechanism having the first end engaged to the slide part and the second end engaged to the fixated base, the pulling mechanism pulling the slide part toward the second end relatively with respect to the fixated base. One of the mutual contact surface of the slide part and the mutual contact surface of the fixated base has a rough surface while the other is covered in a resin film.

In the present disclosure, the slide part includes a elongated aperture and is pressed against the fixated base with a first screw inserted through the elongated aperture and screwed to the fixated base, and a first flanged sleeve is preferably mounted between the first screw and the elongated aperture.

In the present disclosure, the second end of the scale is screwed to the slide part with a second screw and a second flanged sleeve is preferably installed between the second screw and the second end of the scale.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings, and wherein.

DETAILED DESCRIPTION OF THE INVENTION

Figure 1:
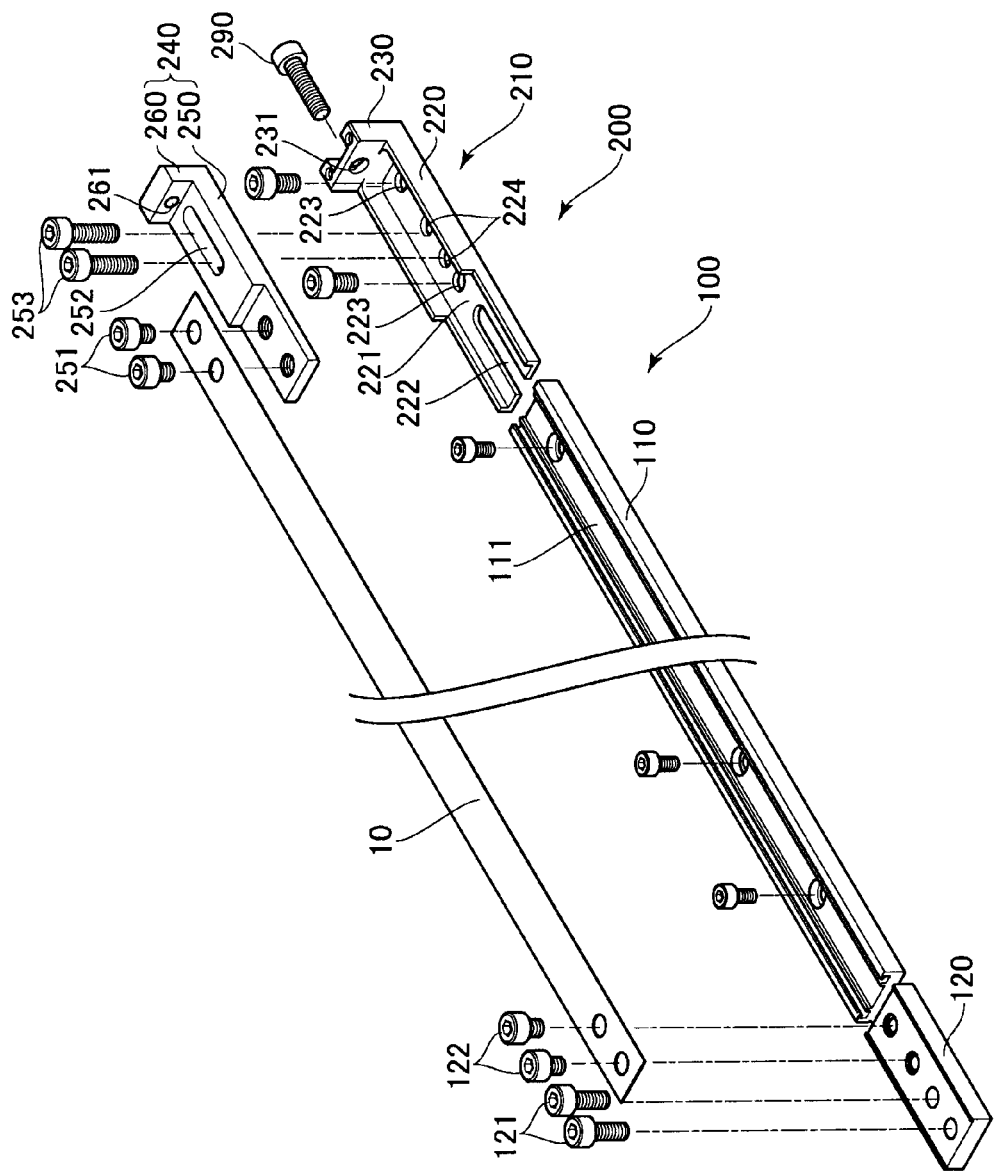
FIG. 1 is an exploded perspective view of a tape scale fixating device.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

An embodiment of the present disclosure is shown and described with reference to numerals given to each element in the drawings.

First Embodiment

Figure 2:
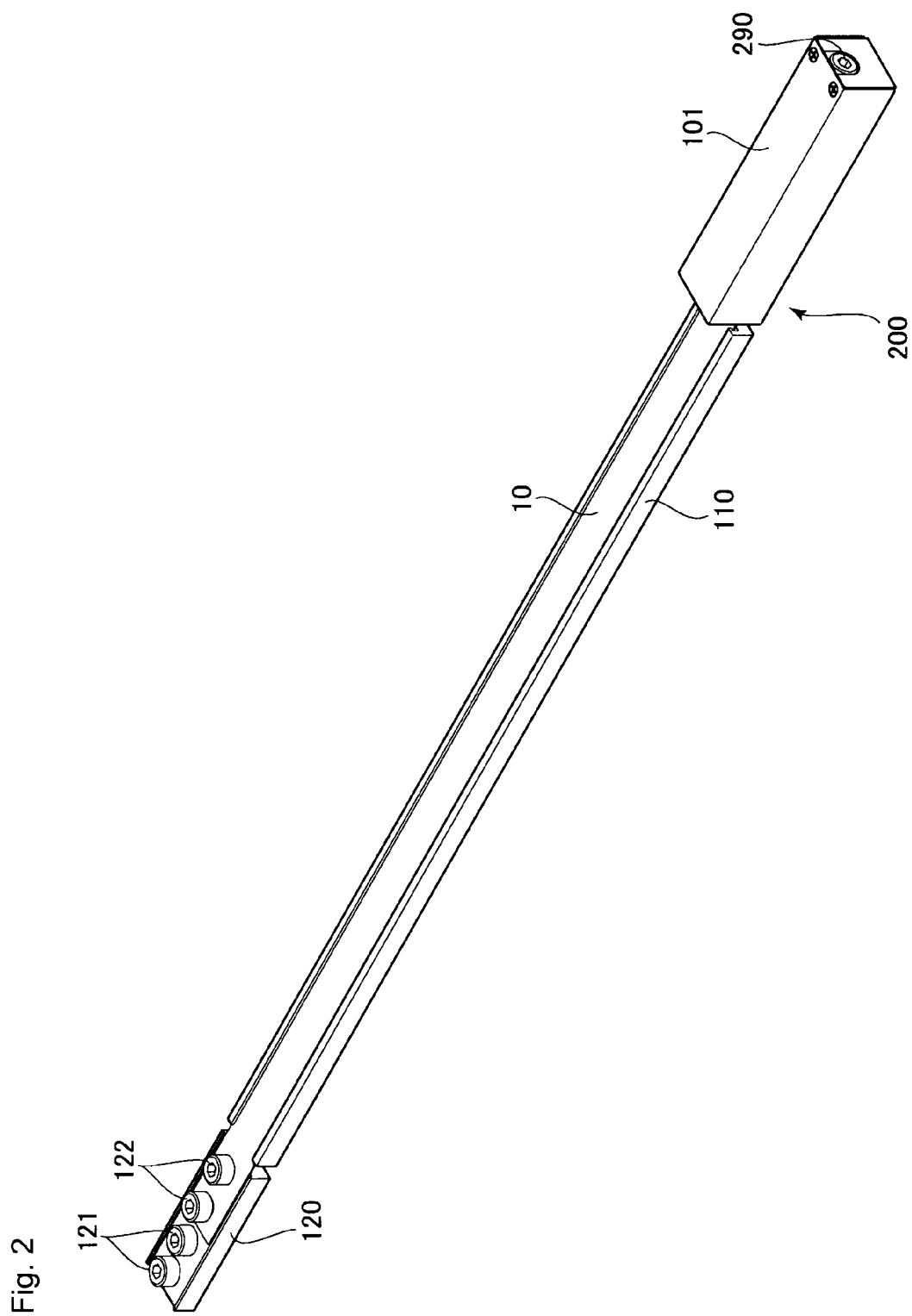
FIG. 2 is an external view of the tape scale fixating device.

A primary configuration of a tape scale fixating device 100 is described with reference to FIGS. 1 to 4. Points of the present disclosure are described thereafter. FIG. 1 is an exploded perspective view of the fixating device 100 of a tape scale 10. FIG. 2 is an external view of an assembled state. The fixating device 100 of the tape scale 10 includes an elongated scale holder 110, a fixing block part 120 arranged on a first end side of the scale holder 110 in a length direction, and a pulling block part 200 arranged on a second end side of the scale holder 110 in the length direction. The scale holder 110, the fixing block part 120, and the pulling block part 200 are formed mainly of metals such as aluminum, an aluminum alloy, or a SUS material.

The scale holder 110 includes a groove into which the tape scale 10 fits. The fixing block part 120 is fixated to an object (not shown) by fixing screws 121. Furthermore, the fixing block part 120 is screwed to a first end of the tape scale 10 by screws 122.

Figure 3:
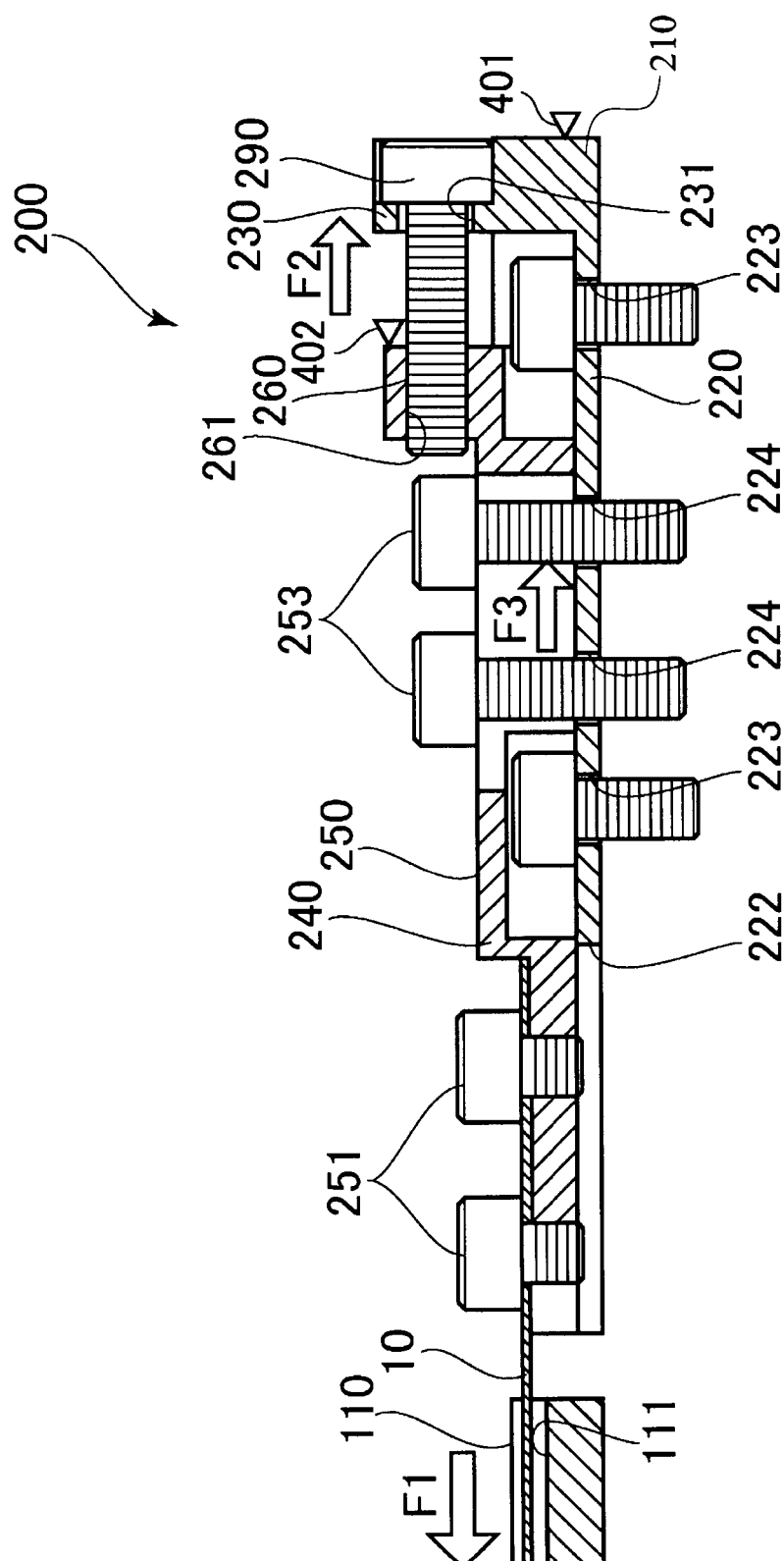
FIG. 3 is a cross-sectional view of a pulling block part.
Figure 4:
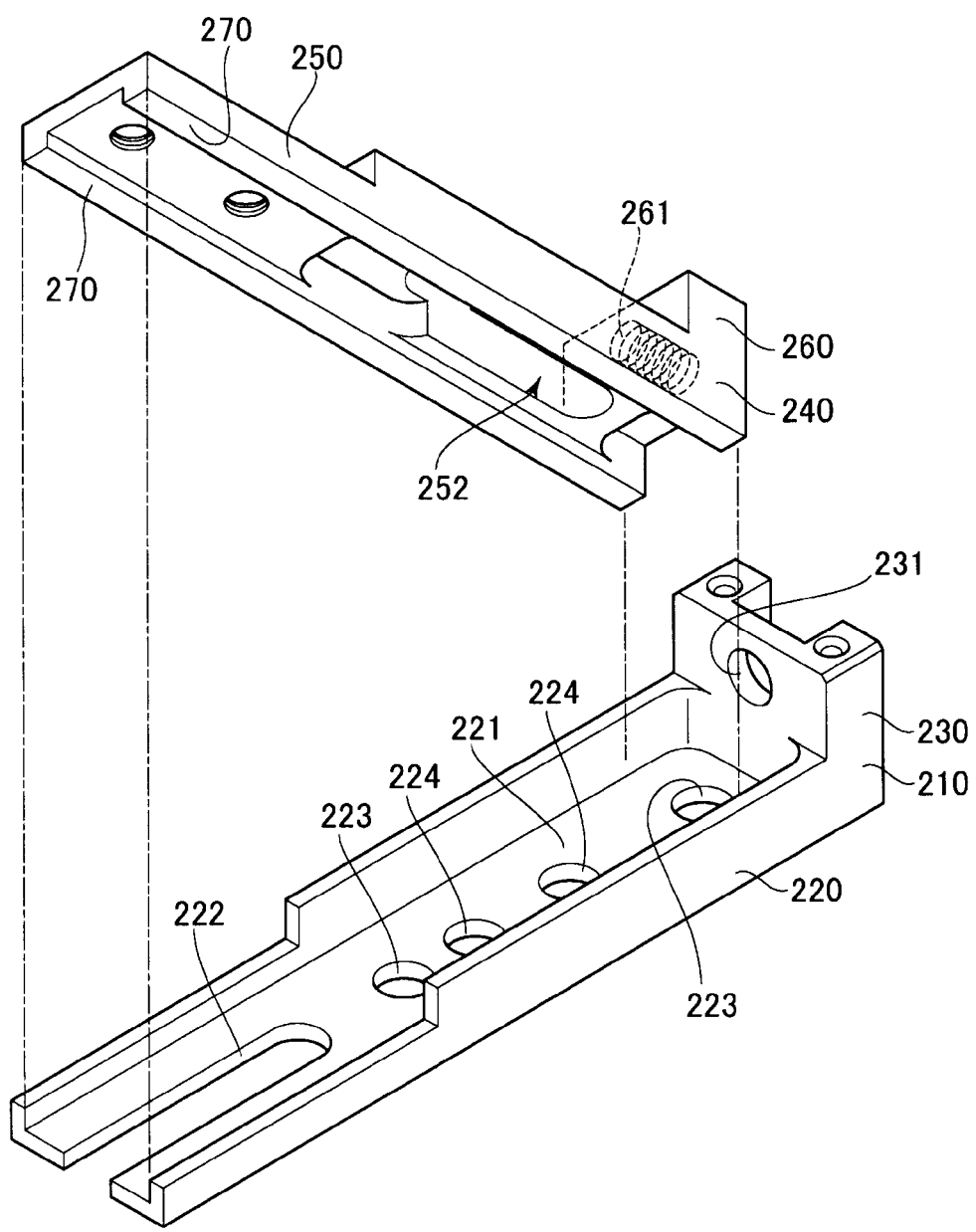
FIG. 4 is an expanded view of a fixated base and a slide part.

FIG. 3 is a cross-sectional view of the pulling block part 200 and FIG. 4 is an expanded view of a fixated base 210 and a slide part 240. The pulling block part 200 includes the fixated base 210, the slide part 240, and a pulling screw (pulling mechanism or puller) 290.

The fixated base 210 is fixated to an object. The fixated base 210 includes a base portion 220 and a pulling wall 230. The base portion 220 is long in a measurement axis direction and includes a groove 221 where the slide part 240 can slide along the length direction (measurement axis direction). The base portion 220 includes a slit 222 in the groove 221, with a length from a first end partway toward a second end of the base portion 220 in the length direction. In addition, the base portion 220 includes four screw holes 223 and 224 along the length direction between substantially a center of the groove 221 and the second end. Of the four screw holes, the two on each end (223) are holes to screw the fixated base 210 to the object. The two in the middle (224) are holes for screwing in screws 253, which press the slide part 240 provided inside the groove 221 of the fixated base 210 against the fixated base 210.

The pulling wall 230 is upright in an L-shape on the second end of the base portion 220 in the length direction (so as to be substantially perpendicular to the object when the base portion 220 is fixated to the object) and is a wall on the fixating side pulling the slide part 240. Furthermore, the pulling wall 230 includes a hole 231 through which the pulling screw 290 passes.

The slide part 240 includes a holding piece 250 and an end plate 260. The holding piece 250 is arranged in the groove 221 of the base portion 220 and is slidable along the measurement axis direction. The second end of the tape scale 10 is screwed with screws (251) onto a top surface of a first end side of the holding piece 250 (an opposite surface to a surface facing the base portion 220), and the holding piece 250 holds the second end of the tape scale as a result. Moreover, a tip of each of the screws 251 enters the slit 222 of the base portion 220 such that the tape scale 10 is not fixated to the base portion 220. When the slide part 240 slides with respect to the fixated base 210, the tape scale 10 and the slide part 240 are integrally slidable with respect to the fixated base 210. In addition, the holding piece 250 includes a elongated aperture 252 along the length direction between substantially the center and the second end. The elongated aperture 252 has a width through which threaded portions of the screws 253 can pass but head portions of the screws 253 cannot. Also, the threaded portions of the screws 253 are screwed into the screw holes 224 of the base portion 220 and the slide part 240 is pressed against the fixated base 210 by the head portions of the screws 253 while slide movement of the slide part 240 is allowed by the elongated aperture 252.

The end plate 260 is upright in an L-shape on the second end of the holding piece 250 and includes a screw hole 261 into which the pulling screw 290 is screwed. The pulling screw 290 is passed through the hole 231 of the pulling wall 230 and screwed into the screw hole 261. As the pulling screw 290 is tightened, the end plate 260 is pulled toward the pulling wall 230. By tightening the pulling screw 290, a predetermined tension is applied to the tape scale 10.

In FIG. 3, triangle marks show measurement points measured by an electric micrometer. A first electric micrometer (401) confirms that the fixated base 210 does not move. A second electric micrometer (402) monitors displacement of the slide part 240. While watching a detection value from the second electric micrometer (402), the pulling screw 290 is tightened until an amount of displacement of the slide part 240 reaches the predetermined value.

Next, a force applied to the slide part 240 is focused. The slide part 240 is pulled toward the second end side by the pulling screw 290. This force is called "a second end side pulling force F2" (see FIG. 3). In addition, the slide part 240 is pulled toward the first end side by the tape scale 10. This force is called "a first end side pulling force F1" (see FIG. 3).

Furthermore, the slide part 240 is pressed against the fixated base 210 by the screws 253 inserted into the elongated aperture 252 of the holding piece 250. Specifically, a friction force F3 acts between a reverse surface of the holding piece 250 and a front surface of the base portion 220 (a bottom surface of the groove 221). When installed with tension applied to the tape scale 10, the slide part 240 stays at a position with three forces in balance: the second end side pulling force F2, the first end side pulling force F1, and the friction force F3. (Of course, other forces are applied such as a friction force between the screws 253 and the holding piece 250, but the three main forces are named to facilitate understanding.)

The second end side pulling force F2 and the first end side pulling force F1 are considered to be unchanged over time. Instead, the present inventors focus on the friction force F3, which has been disregarded until now, and realize that the slide part 240 may be displaced by changes to the friction force F3. When environmental temperature is changed from 0° C. to 50° C. for example, the base portion 220 and the holding piece 250 are slightly thermally deformed and the friction force F3 between the base portion 220 and the holding piece 250 changes. For example, the friction force F3 may become smaller. Then, the balance between the second end side pulling force F2, the first end side pulling force F1, and the friction force F3 changes, and therefore the balance position is displaced.

Based on such findings, the present inventors have confirmed that there are three measures for effective solutions. A first measure is to prevent the friction force from changing even when there is a change in temperature. A second measure is to have no friction from the beginning. A third measure is to render the slide part 240 unmovable by generating an extremely large friction force. Descriptions are provided in that order.

(1) Bevel Reverse Surface of Slide Part 240.

Figure 5:
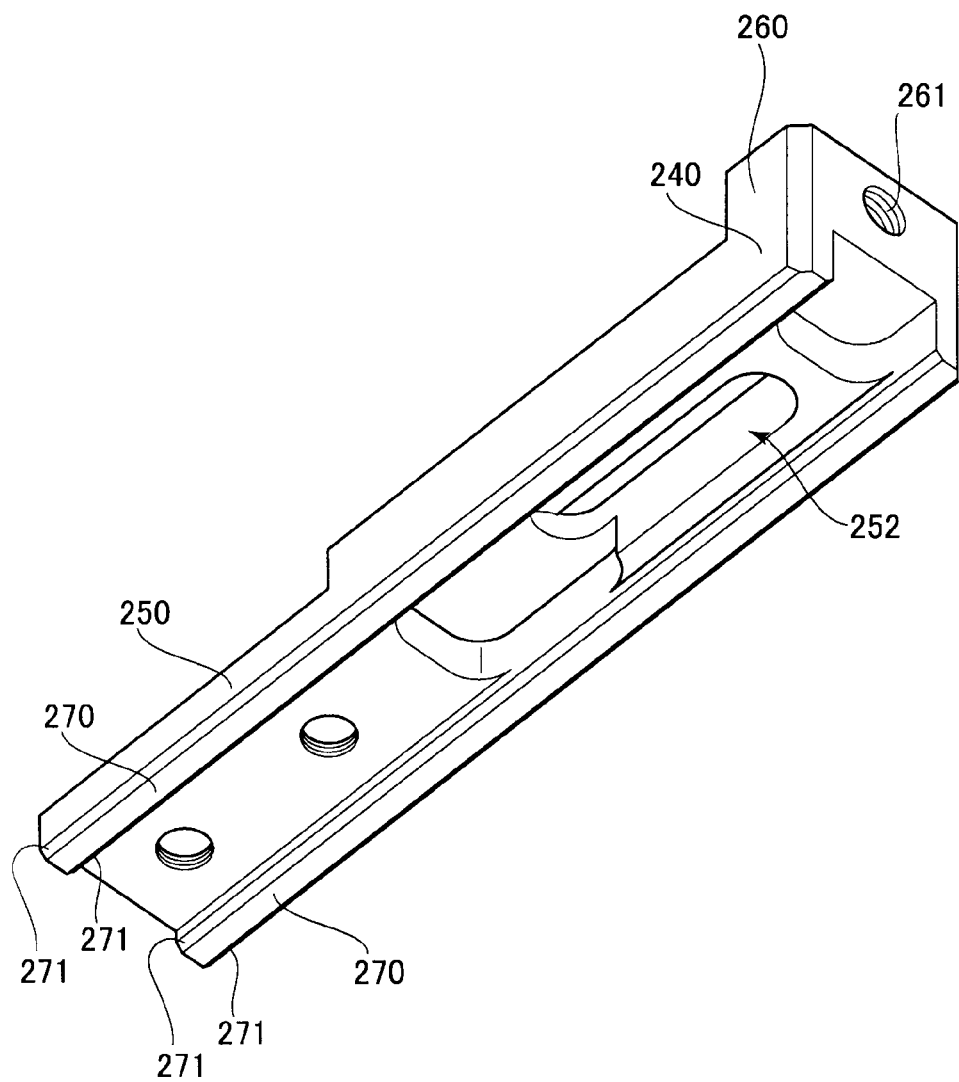
FIG. 5 illustrates a beveled slide part.

The slide part 240 is processed by cutting and therefore a burr may remain on an edge. When the burr remains, the burr comes in contact with the base portion 220, and thus a contact area between the slide part 240 and the base portion 220 becomes extremely small. If there is a change in temperature and the like, the friction force F3 changes and the slide part 240 may experience an unexpected slide. Therefore, the edge of the reverse surface of the slide part 240 is preferably beveled. As shown in FIG. 5, the reverse surface of the slide part 240 has two projecting legs 270 on both sides in a width direction. Accordingly, an outer edge and an inner edge of each leg 270 are beveled (271). As a result, the slide part 240 and the base portion 220 come into surface-to-surface contact, and therefore the change of the friction force within a guaranteed temperature range becomes sufficiently small. Therefore, the slide part 240 is not displaced, or, even if displaced, the amount of displacement can be made sufficiently small.

(2) Compensate for Variation in Components.

Figure 6:
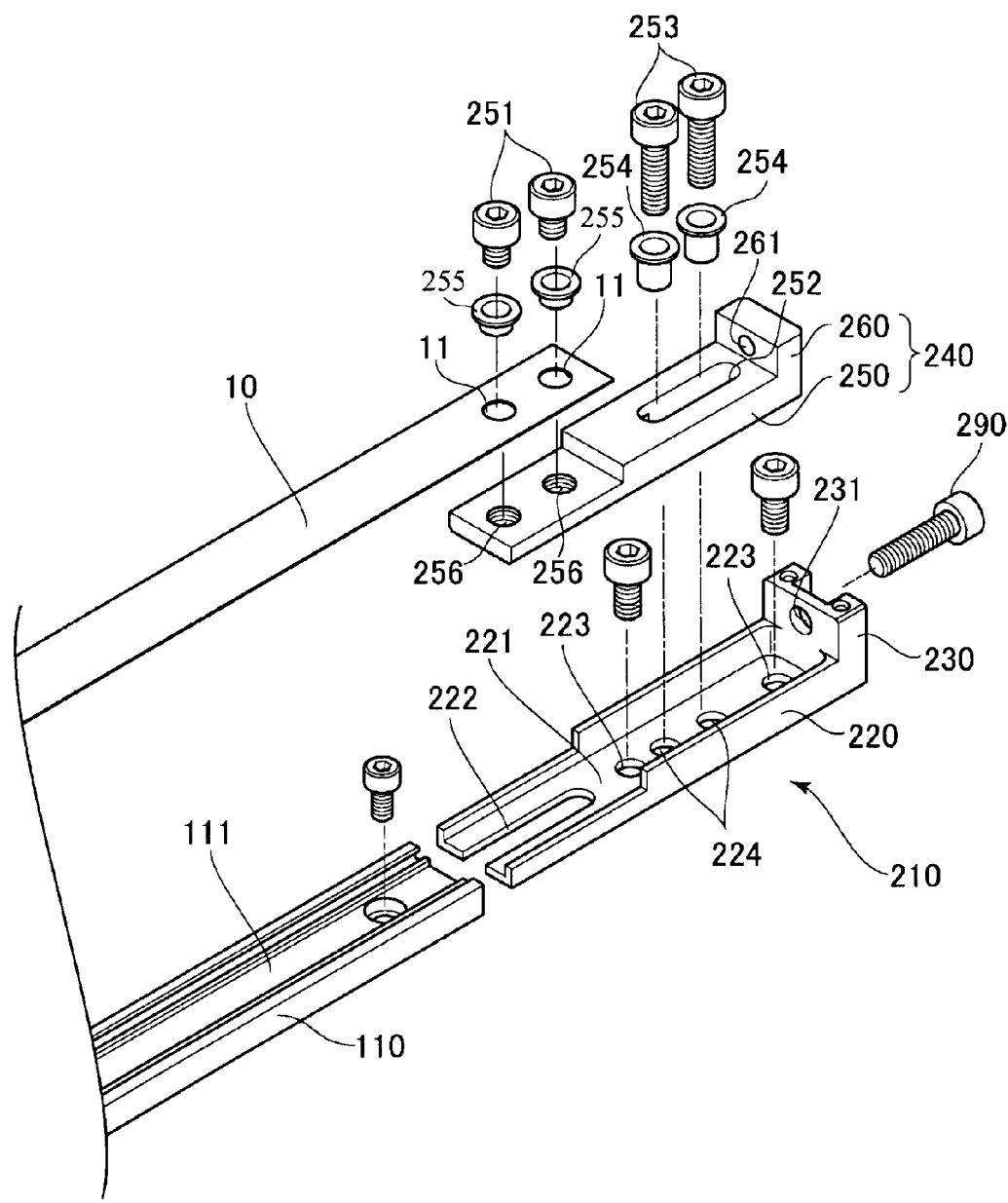
FIG. 6 illustrates a flanged sleeve.

The slide part 240 is pressed against the base portion 220 by pressing the screws 253 through the elongated aperture 252 of the holding piece 250 and screwing the screws 253 into the screw holes 224 of the base portion 220. However, variations in a pressing force may be caused due to variations in components. For example, a length from a bearing surface to a tip of the screw 253, roundness of a screw neck, and flatness of the bearing surface are likely to introduce variations. As a result, even if the screws 253 are tightened with the predetermined force, there is a possibility that the pressing force may be too strong or too weak. As shown in FIG. 6, flanged sleeves 254 are mounted between the screws 253 and the elongated aperture 252. As a result, variations in the components (the screws 253 and the slide part 240) are covered and the slide part 240 can be pressed against the base portion 220 with the predetermined pressing force every time when the screws 253 are tightened with the predetermined force.

More preferably, when screwing the second end of the tape scale 10 to the holding piece 250, flanged sleeves 255 are preferably mounted between the screws 251 and the tape scale 10. When a diameter of holes 11 drilled in the tape scale 10 is larger than the diameter of the screws 251, a gap is created between the hole 11 and the screw 251. The gap can produce a margin in which the tape scale 10 relatively displaces with respect to the holding piece 250. Therefore, it is better to mount the flanged sleeves 255 between the screws 251 and the tape scale 10 so as to eliminate the gap between the holes 11 and the screws 251 as much as possible and to firmly press the tape scale 10 with the screws 251.

Moreover, the tape scale 10 is thin such that sleeves of the flanged sleeves 255 need to be processed to be fairly short. If a thickness of the tape scale 10 is 0.2 mm, the length of the sleeve portion of the flanged sleeve 255 is processed to about 0.1 mm. When the length of the sleeve portion of the flanged sleeve 255 is to be several mm (about 1 mm, for example), the thickness of the first end side of the tape scale 10 can be slightly thicker or a shallow dent can be provided around a periphery of the screw holes 256 of the holding piece 250.

(3) Mirror Finish One Side Only.

By mirror finishing one of the bottom surface of the groove 221 of the base portion 220 and the reverse surface of the holding piece 250, the friction between the two becomes minimal, and is ideally zero. If there is no friction between the base portion 220 and the holding piece 250 from the beginning, the slide part 240 will not be displaced by a change in the friction force F3. A mirror surface may be defined as, for example, an arithmetic average roughness Ra of several tens of nm or less (such as 80 nm or less), and preferably 10 nm or less if possible.

(4) Mirror Finish Both Sides.

By mirror finishing both the bottom surface of the groove 221 of the base portion 220 and the reverse surface of the holding piece 250, the friction between the two is extremely increased. The extremely large friction force is generated when both mirror-finished metals (such as aluminum) come in close contact. As a result, the slide part 240 is not displaced by a change in the friction force F3. The mirror surface may be defined as, for example, the arithmetic average roughness Ra of several tens of nm or less (such as 80 nm or less), and preferably 10 nm or less if possible.

Results of Assessment

Figure 7:
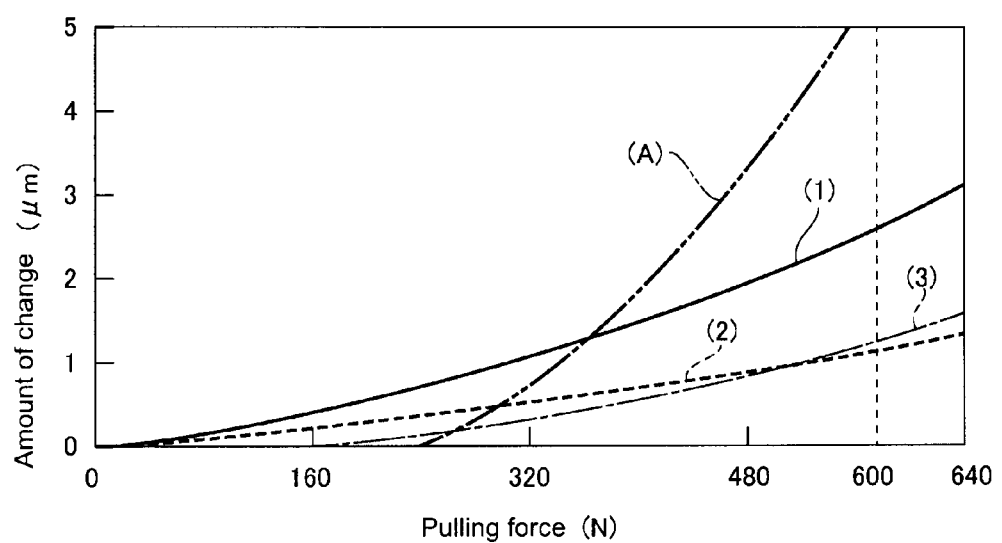
FIG. 7 illustrates assessment results.

FIG. 7 shows results of an assessment. FIG. 7 shows results of measuring the displacement of the slide part 240 with the second electric micrometer (402) after tightening the pulling screw 290 until an amount of pulling of the slide part 240 reaches the predetermined value. (A positive value indicates displacement to the first end side.) The length of the tape scale is 1 m. A line at a pulling force at 600 N is shown in the drawing. 600 N corresponds to the pulling force which can absorb an amount of expansion/contraction at a temperature change of 40° C. Line (A) in the drawing shows the result when the slide part 240 is not beveled. Line (1) in the drawing shows the result when the slide part 240 is beveled. Line (2) in the drawing shows the result when the slide part 240 is beveled and further mounted with the flanged sleeves 254 between the screws 253 and the elongated aperture 252. Line (3) in the drawing shows the result when the bottom surface of the groove 221 of the base portion 220 and the reverse surface of the holding piece 250 are mirror finished.

Based on the results in FIG. 7, the measures mentioned above show positive results.

(5) One Rough Surface and Other Surface Covered in Resin Film.

Figure 8:
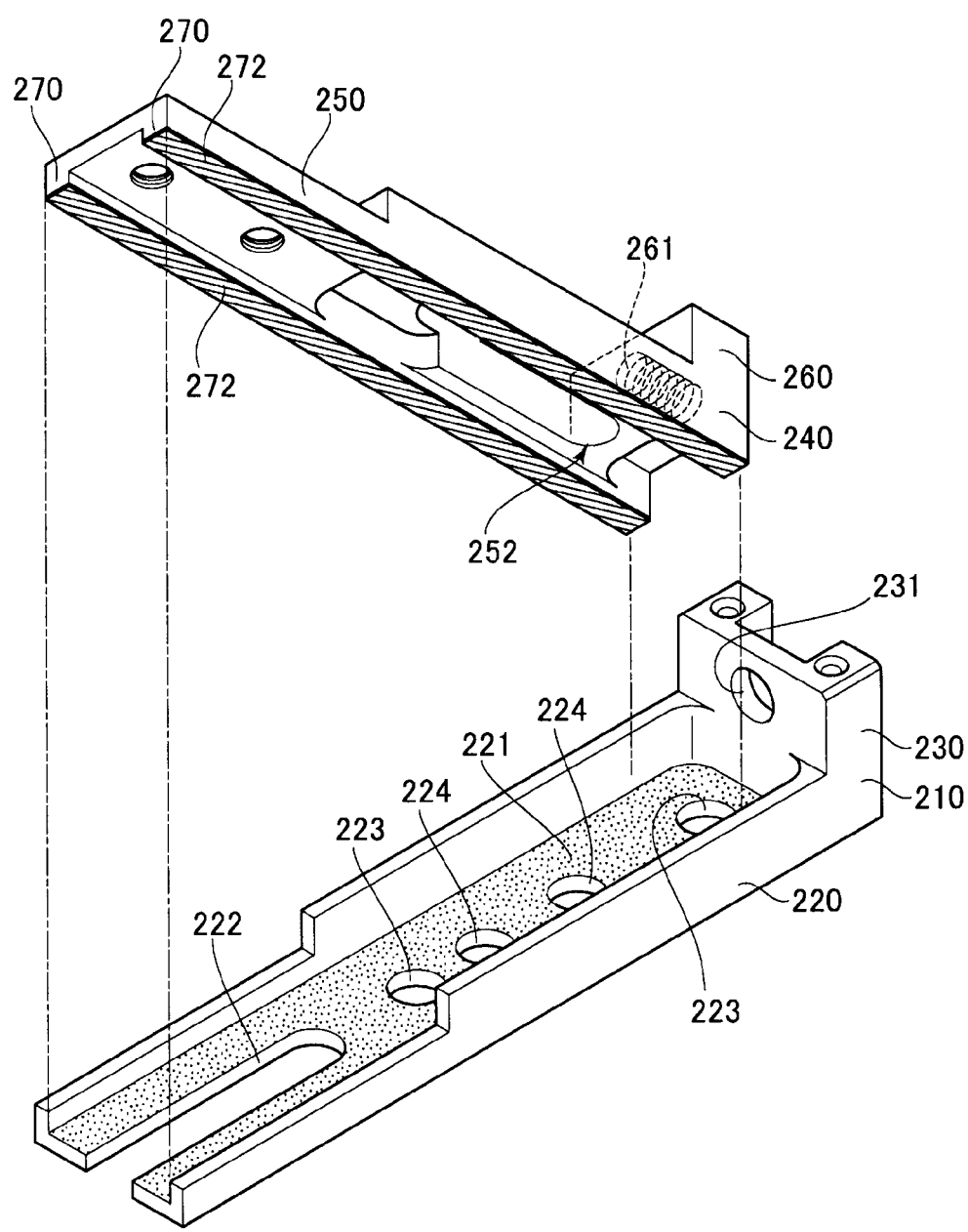
FIG. 8 illustrates a case where a base portion has a rough surface and a thin film is formed on a holding piece.

When a first member has a rough surface and a second member is covered in a resin film, the first member holds on to the second. As shown in FIG. 8, for example, the bottom surface of the groove 221 of the base portion 220 is configured to be rough and the reverse surface of the holding piece 250 is covered with a thin film 272 of resin, for example. Naturally, the reverse surface of the holding piece 250 may instead be configured to be rough and the bottom surface of the groove 221 of the base portion 220 may be covered in the resin film. As a result, the friction force between the two is maintained, preventing the displacement of the slide part 240. A rough surface may be defined as, for example, the arithmetic average roughness Ra of between several tenths of a μm and several tens of μm, with between 0.1 μm and 50 μm given as an example.

Moreover, the present invention is not limited to the embodiments described above, and may be modified as needed without departing from the scope of the present invention. For example, so long as the slide part is pulled relatively to the second end side with respect to the fixated base, the pulling screw can be replaced by an elastic body such as a spring. The shapes of the fixated base and the slide part are merely examples.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A scale fixating device installing and fixating a scale to an object, the device comprising:
   a fixing block configured to immovably fix a first end of the scale to the object; and
   a pulling block configured to fix a second end of the scale to an object while pulling the second end of the scale, wherein the pulling block comprises:
   a base fixed to the object;
   a slide configured to hold the second end of the scale and slidably installed with respect to the base; and
   a puller having a first end engaged with the slide and a second end engaged with the base, the puller configured to pull the slide toward the second end relatively with respect to the base, wherein a surface of the slide contacting the base is beveled.

2. The scale fixating device according to claim 1, wherein: the slide includes an elongated aperture and is pressed against the base with a first screw inserted through the elongated aperture and screwed to the base, and
   a first flanged sleeve is mounted between the first screw and the elongated aperture.

3. The scale fixating device according to claim 2, wherein the second end of the scale is screwed into the slide part by a second screw, and
   a second flanged sleeve is mounted between the second screw and the second end of the scale.

4. The scale fixating device according to claim 1, wherein the second end of the scale is screwed into the slide part by a second screw, and
   a second flanged sleeve is mounted between the second screw and the second end of the scale.

5. A scale fixating device installing and fixating a scale to an object, the device comprising:
   a fixing block configured to immovably fix a first end of the scale to the object; and
   a pulling block configured to fix a second end of the scale to an object while pulling the second end of the scale, wherein the pulling block comprises:
   a base fixed to the object;
   a slide configured to hold the second end of the scale and slidably installed with respect to the base; and
   a puller having a first end engaged with the slide and a second end engaged with the base, the puller configured to pull the slide toward the second end relatively with respect to the base, wherein at least one of a mutual contact surface of the slide and the base is mirror finished.

6. The scale fixating device according to claim 5, wherein: the slide includes an elongated aperture and is pressed against the base with a first screw inserted through the elongated aperture and screwed to the base, and
   a first flanged sleeve is mounted between the first screw and the elongated aperture.

7. The scale fixating device according to claim 6, wherein the second end of the scale is screwed into the slide part by a second screw, and
   a second flanged sleeve is mounted between the second screw and the second end of the scale.

8. The scale fixating device according to claim 5, wherein the second end of the scale is screwed into the slide part by a second screw, and
   a second flanged sleeve is mounted between the second screw and the second end of the scale.

9. A scale fixating device installing and fixating a scale to an object, the device comprising:
   a fixing block configured to immovably fix a first end of the scale to the object; and
   a pulling block configured to fix a second end of the scale to an object while pulling the second end of the scale, wherein the pulling block part comprises:
   a base fixed to the object;
   a slide configured to hold the second end of the scale and slidably installed with respect to the base; and
   a puller having a first end engaged with the slide and a second end engaged with the base, the puller configured to pull the slide toward the second end relatively with respect to the base, wherein one of a mutual contact surface of the slide and the base has a rough surface while the other of the mutual contact surface of the slide and the base is covered in a resin film.

10. The scale fixating device according to claim 9, wherein:
    the slide includes an elongated aperture and is pressed against the base with a first screw inserted through the elongated aperture and screwed to the base, and
    a first flanged sleeve is mounted between the first screw and the elongated aperture.

11. The scale fixating device according to claim 10, wherein the second end of the scale is screwed into the slide part by a second screw, and a second flanged sleeve is mounted between the second screw and the second end of the scale.

12. The scale fixating device according to claim 9, wherein the second end of the scale is screwed into the slide part by a second screw, and a second flanged sleeve is mounted between the second screw and the second end of the scale.

* * * * *